Figure 1:
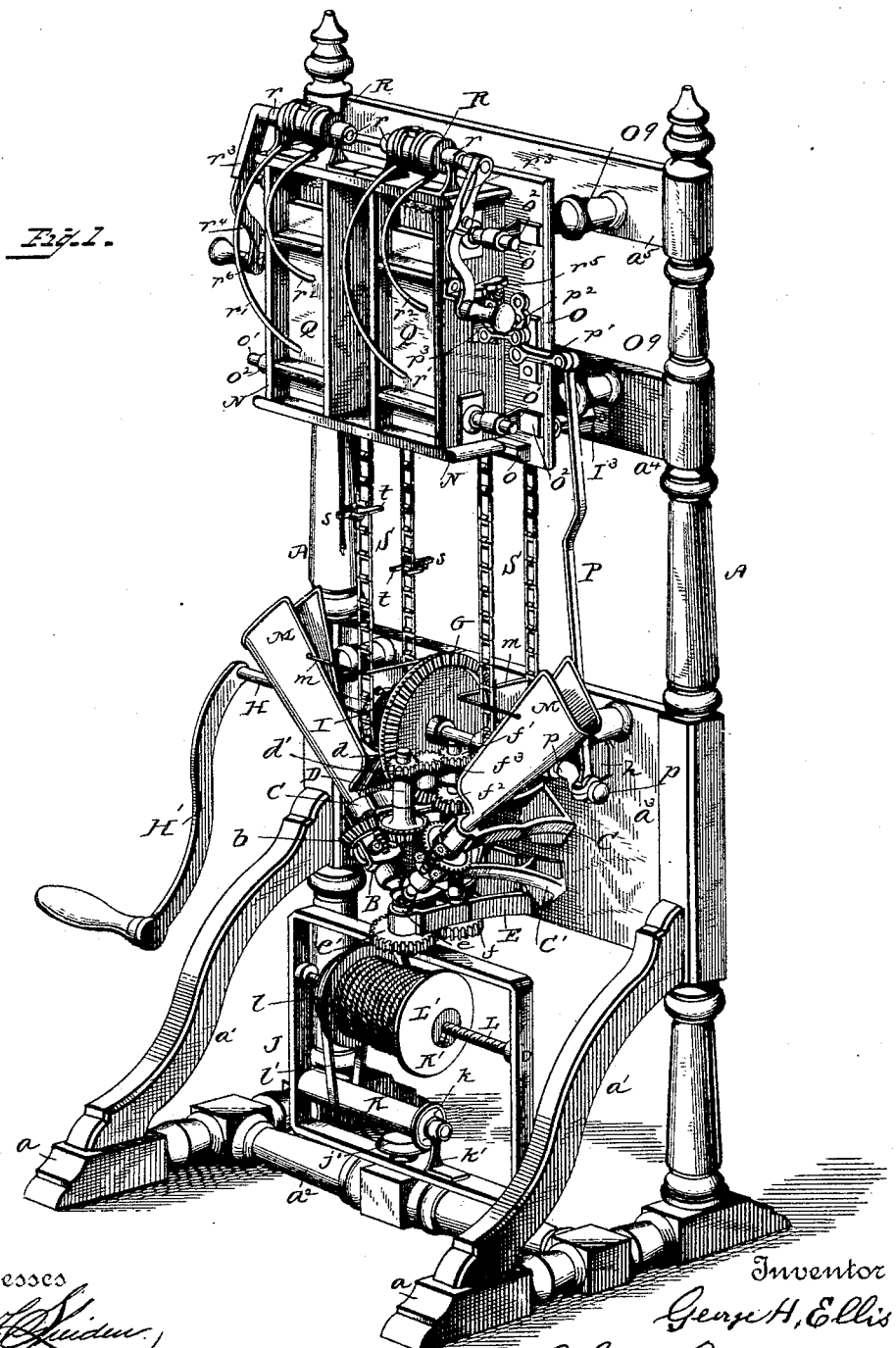

(No Model.) 5 Sheets—Sheet 1.
G. H. ELLIS.
MACHINE FOR MAKING TWINE FROM STRAW, GRASS, &c.

No. 459,237. Patented Sept. 8, 1891.

Witnesses
Inventor
George H. Ellis
By his Attorneys Lacey

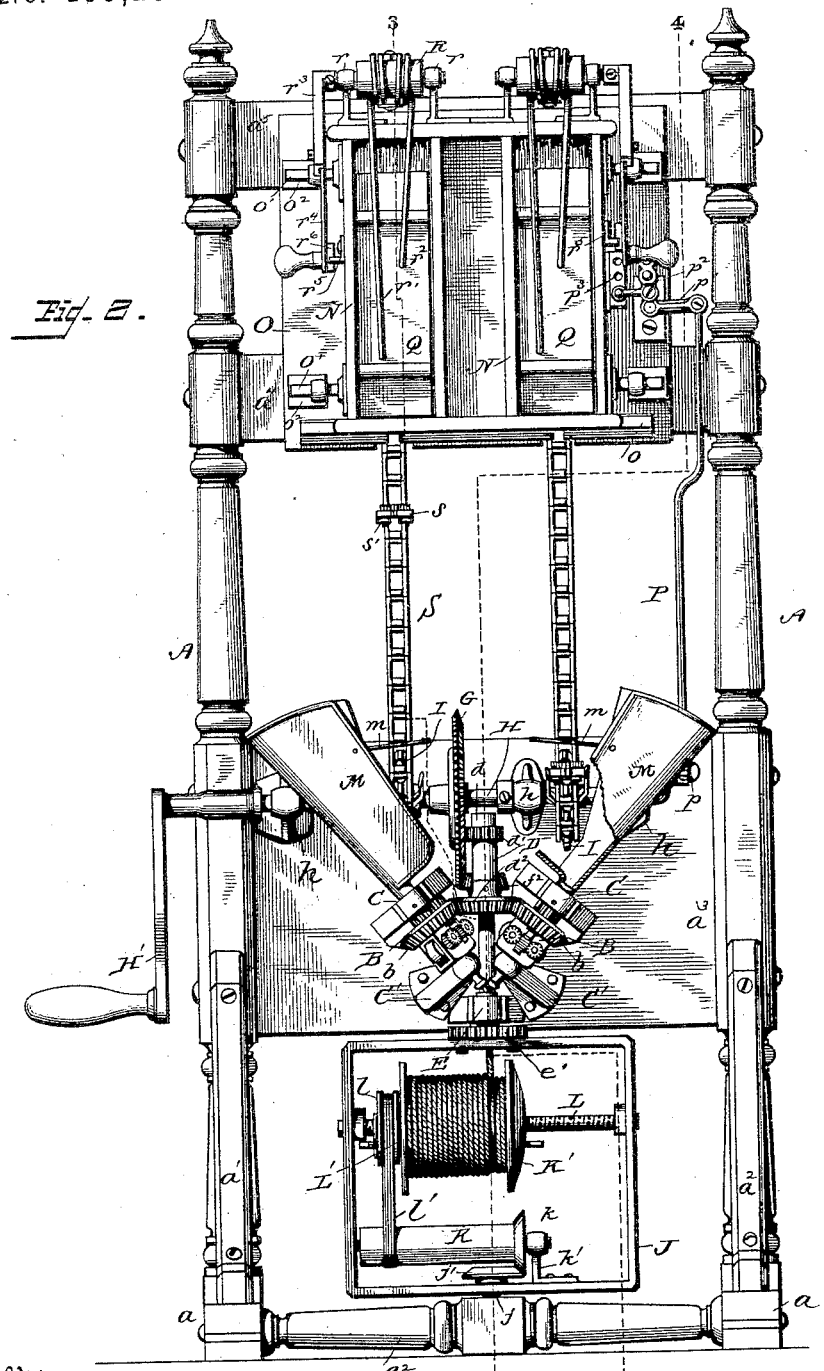

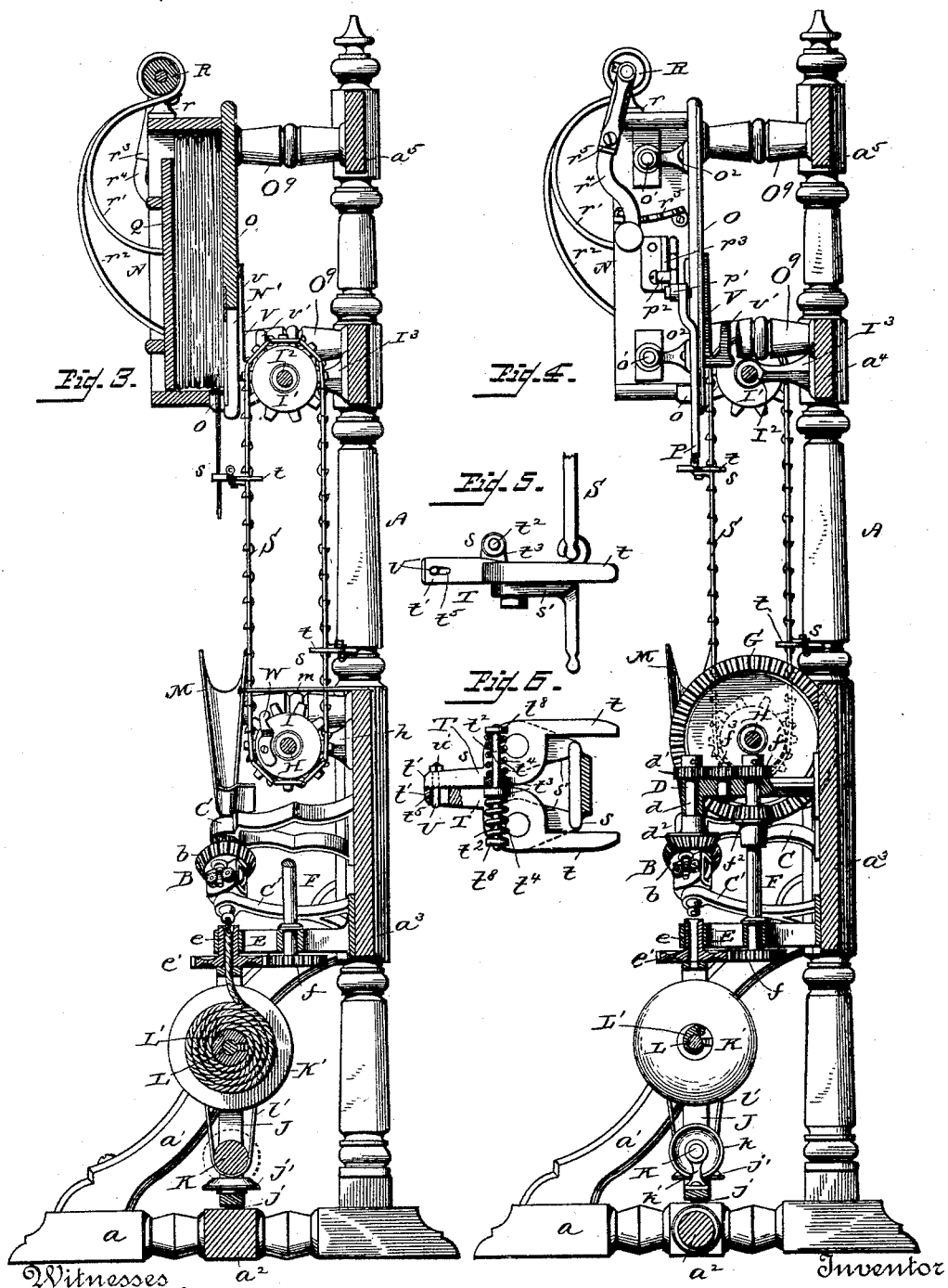

(No Model.) 5 Sheets—Sheet 4.
G. H. ELLIS.
MACHINE FOR MAKING TWINE FROM STRAW, GRASS, &c.
No. 459,237. Patented Sept. 8, 1891.
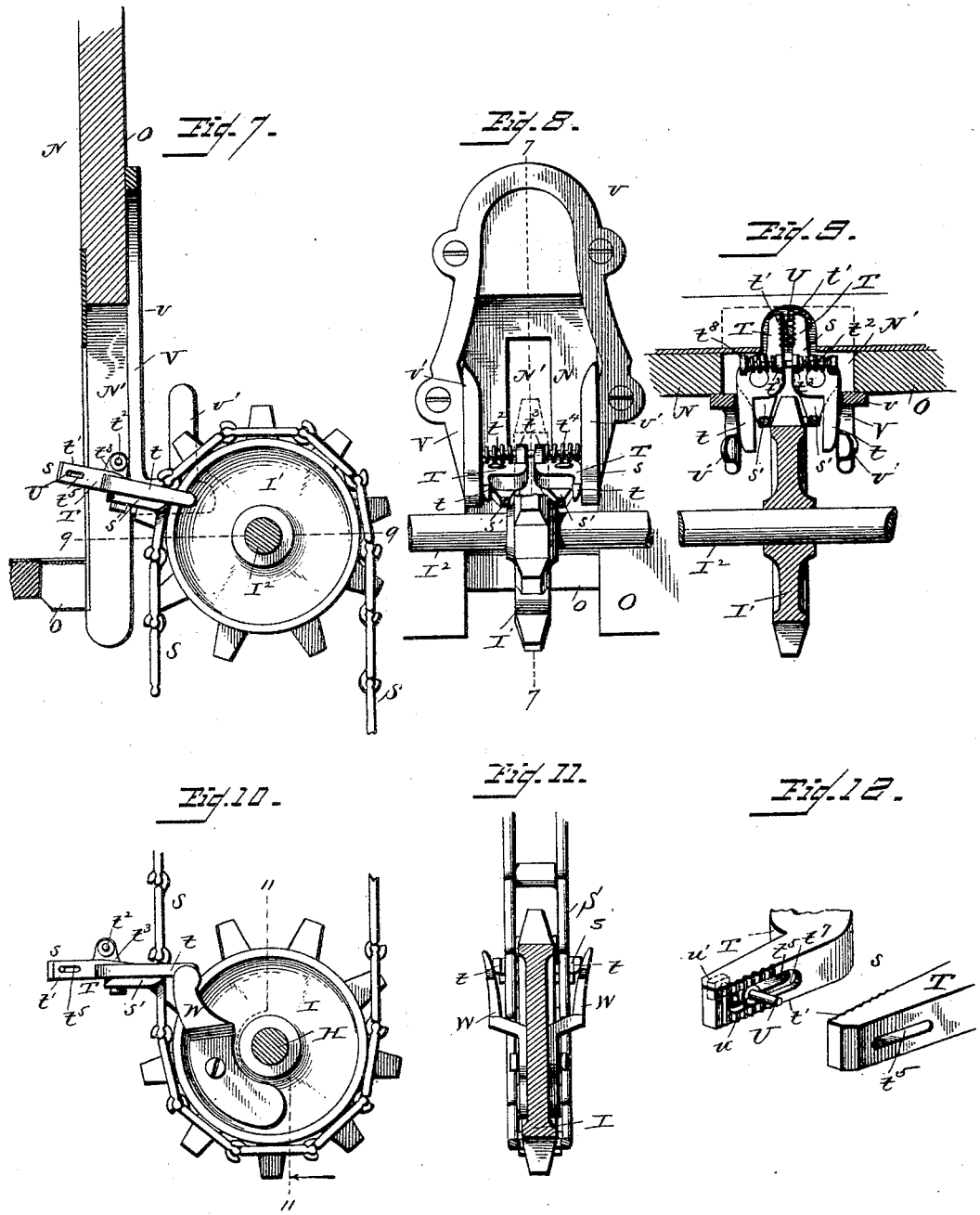
Witnesses
Inventor
George H. Ellis
By his Attorneys
R. S. & A. P. Lacey

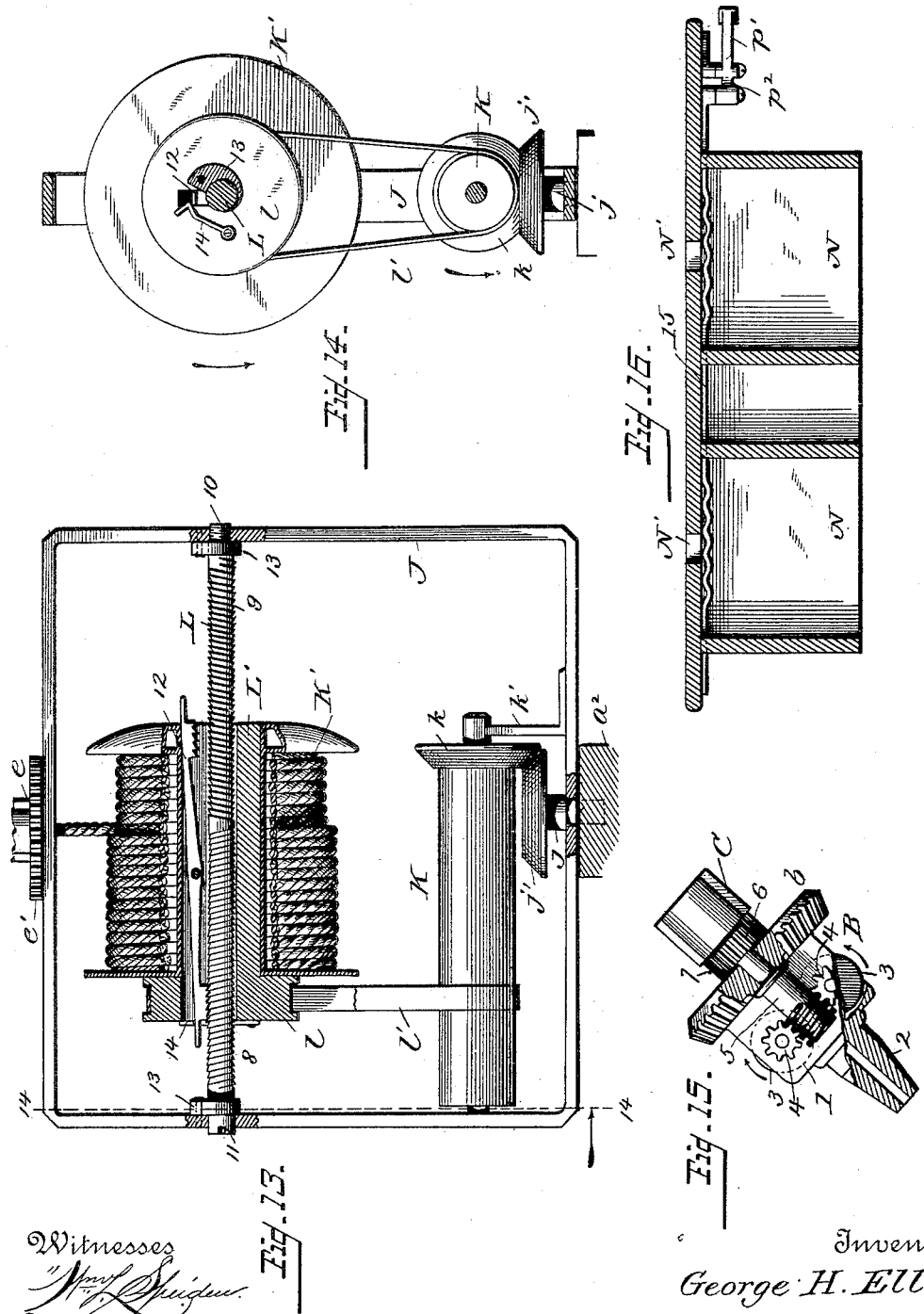

UNITED STATES PATENT OFFICE.

GEORGE H. ELLIS, OF SAUK CENTRE, MINNESOTA, ASSIGNOR OF ONE-HALF TO HENRY KELLER, OF SAME PLACE.

MACHINE FOR MAKING TWINE FROM STRAW, GRASS, &c.

SPECIFICATION forming part of Letters Patent No. 459,237, dated September 8, 1891.

Application filed July 26, 1890. Serial No. 360,057. (No model.)

*To all whom it may concern:*

Be it known that I, GEORGE H. ELLIS, a citizen of the United States, residing at Sauk Centre, in the county of Stearns and State of Minnesota, have invented certain new and useful Improvements in Machines for Making Twine from Straw, Grass, &c.; and I do hereby declare the following to be a full, clear, and exact description of the invention, such as will enable others skilled in the art to which it appertains to make and use the same.

This invention relates to machines for making twine from straw, flax, hemp, grass, and similar material in their crude state.

The purpose of the invention is to utilze such material as is generally let go to waste or gathered for fuel and to convert it into a twine which will fill a long-felt want among the people of agricultural districts, and also to place within their reach a machine by means of which they can make their own twine.

A further purpose of the invention is to provide a machine for making twine that will perform the work in a rapid and efficient manner and which can be operated by a man, woman, or child, and which will be automatic in its action from the feeding of the twine-forming material to the spinning mechanism to the balling or reeling of the completed twine.

A still further purpose of the invention is the provision of a machine that will be compact in the arrangement of its parts and which can be conveniently operated and will give satisfactory results, the twine produced being pliable, strong, and of a uniform thickness throughout its length, thereby adapting it for use in any ordinary harvester-binder.

The improvement consists of the novel features, which will be hereinafter more fully described, and particularly pointed out in the claims, and which are shown in the annexed drawings, in which—

Figure 1 is a perspective view of a machine embodying my invention. Fig. 2 is a front view of the machine, part of one guide or chute being broken away. Fig. 3 is a section on the line 3 3 of Fig. 2, looking to the left. Fig. 4 is a section, partly broken away, substantially on the line 4 4 of Fig. 2, looking to the left. Fig. 5 is a side view of a picker, showing the manner of attaching it to the chain. Fig. 6 is a top plan view of a picker, parts being broken away. Fig. 7 is a vertical section on the line 7 7 of Fig. 8, showing the sprocket-wheel, chain, and a picker in elevation. Fig. 8 is a rear view of the lower portion of the base on which the hoppers are mounted, showing the relative arrangement of the sprocket-wheel, picker, and tripping device, parts being broken away. Fig. 9 is a horizontal section on the line 9 9 of Fig. 7, the picker and tripping device being shown in elevation. Fig. 10 is a detail side view of the lower sprocket-wheel, showing the picker in the act of engaging with the tripper, which is secured to the side of the said sprocket-wheel. Fig. 11 is a section on the line 11 11 of Fig. 10, looking to the left. Fig. 12 is a detail view of the front ends of a picker. Fig. 13 is a side elevation of the flier on a larger scale, showing the spool-support and the spool in section and having parts of the frame broken away. Fig. 14 is a section on the line 14 14 of Fig. 13, looking to the right. Fig. 15 is a side elevation of a twisting-head, parts being broken away. Fig. 16 is a horizontal section of a modified form of hopper and agitator.

The frame of the machine is suitably constructed to support the operating parts of the machine, and in the present case is shown as consisting of the standards A A, sills $a\ a$, braces $a'\ a'$ between the sills and the standards, cross-bar $a^2$, connecting the sills and the cross-pieces $a^3$, $a^4$, and $a^5$ between the standards, the cross-piece $a^3$ forming a base for the spinning or twine-forming mechanism and the cross-pieces $a^4$ and $a^5$ serving as supports for the hoppers which receive the twine-forming material.

The rotary strand-forming twisting-heads B are of known construction, and are provided in sufficient number to correspond with the number of strands which it is desired to form into the twine, two being shown, and they are arranged with their axes converging, whereby their delivery portions are brought close together, so that the strands may be twisted together as near to the said delivery portions as possible. The twisting-heads B have motion on their axes only, and are journaled at their ends in the brackets C C and C' C'. The twisting-heads herein shown are substantially the same as those shown in my former patents, Nos. 433,855 and 433,856, dated August 5, 1890, and comprise the frame 1, having the miter gear-wheel $b$ at one end, the delivery-tube 2 at the other end, the feed-roller 3 3, the pinions 4 4 on the ends of the feed-roller journals, the shaft 5, journaled in the miter-wheel $b$ and having a worm-thread at one end, which meshes with the pinions 3 3, and having a pinion 6 at the other end, which meshes with gear-wheel 7 on the bracket C. The vertical shaft $d$, journaled in the bracket D, is provided at its upper end with the pinion $d'$ and at its lower end with the miter gear-wheel $d^2$, which meshes with corresponding miter gear-wheels $b$ $b$ on the twisting-heads B B. The rotary head $e$, forming part of the flier which twists together the strands as they emerge from the delivery portions of the strand-forming twisting-heads, is journaled in the bracket E and receives its motion from the vertical shaft F, that is journaled in the brackets D and E by means of the pinion $f$, which is secured to the said shaft F, meshing with the pinion $e'$ on the said rotary head $e$. The idle-pinion $f^3$, journaled in bracket D, meshes with pinion $d'$ and with a pinion $f'$ on the upper end of the shaft F. The bevel-pinion $f^2$ on the shaft F meshes with the crown gear-wheel G, that is mounted on the horizontal shaft H, which is journaled in the bearings or brackets $h$, and on which are secured the sprocket-wheels I. The flier J is journaled at its lower end on the stub-shaft $j$, which is projected up from the cross-bar $a^2$, and which is equipped at its upper end with the bevel friction-wheel $j'$, that is in engagement with a corresponding bevel friction-wheel $k$ on the end of the shaft K, which is journaled at one end in the flier-frame and at its other end in the bracket $k'$, extended up from the flier. The feed-screw L is provided with a right-hand thread 8 on one half and with a left-hand thread 9 on its other half and is mounted at its ends in the side of the frame J. One end of the screw L is threaded at 10 and screws in the side of the frame. The other end 11 is constructed to receive an instrument, by means of which the screw L can be turned to screw or unscrew its threaded end 10 in the side of the frame J. The spool-support L' is mounted on the shaft L and is provided with a groove in one side, in which is pivoted the lever 12 midway of its ends. The lever 12 is provided at each end with a head having teeth to correspond with the thread on the shaft L, with which they are intended to work. The ends of the lever 12 project beyond the ends of the spool-support L' to engage with the cams 13 on the sides of the flier J. The spring 14 on the end of the spool-support L' engages with one end of the lever 12 and holds the said lever in either of its working positions. The spool K' is mounted on the support L', and the latter is operated from the shaft K by the endless belt $l'$, which passes around the said shaft K and a grooved pulley $l$ on the end of the spool-support.

There will be as many hoppers N as there are strand-forming twisting-heads B, two being shown, one for each of the said twisting-heads. These hoppers N are mounted on the base O, which is secured to the supports $a^4$ and $a^5$ by the legs $O^9$, the hopper N being supported on the guard-rail $o$ and by the arms $o'$, which work through openings in the standards $o^2$ that are made fast to the base O. These hoppers are connected together and receive a reciprocating motion, being operated from the shaft H by the pitman P, bell-crank lever $p'$, and link $p^2$. The lower end of the pitman P is connected with the crank or eccentric $p$ on shaft H, and its upper end is connected with the horizontal arm of the bell-crank lever $p'$. The casting $p^3$ on the side of the hopper is provided with a series of apertures, and the vertical arm of the bell-crank lever has a corresponding series of openings. The link $p^2$, which adjustably connects the bell-crank lever with the casting $p^3$, can be shifted as required to vary the movement of the hoppers. If preferred, the hoppers may be stationary, and an internal agitator 15, Fig. 16, may be provided to work through openings in the sides thereof, the agitator being connected with the bell-crank lever in precisely the same manner as the hoppers. The followers or pressure-boards Q Q, one for each hopper, are acted on by spring-pressure to force the twine-forming material in the hopper toward the discharge or egress slots N' N' in the base O. Any spring that will subserve the desired purpose may be employed; but the construction shown is preferred, in that it gives two points of bearing on the follower and admits of the pressure of the springs on the follower being readily adjusted. The rotatory support R, to which the springs $r'$ $r^2$ are secured, is journaled in the bearings $r$ $r$, which extend up from the hopper, and is provided at one end with the crank $r^3$, by means of which the support R may be turned to increase the tension on the springs or throw them up out of the way. The outer portion $r^4$ of the crank is yielding and is provided with the tooth $r^6$, which is adapted to engage with one of the series of teeth in the toothed bar $r^5$ on the side of the hopper. The spring $r^2$ bears on the follower near its upper end and the spring $r'$ presses on the follower near the lower end thereof.

Suitable carriers are provided to convey the straw or twine-forming material from the hoppers to the twine-forming mechanism, and in the present instance they are shown as endless belts or sprocket-chains S, which are provided with pickers $s$ at proper intervals, and which pass around the sprocket-wheels I on the shaft H and around corresponding sprocket-wheels I' on the shaft I², which latter is journaled in bearings $I^3$, that extend from the cross-piece $a^4$. The pickers $s$ are each composed of two jaws T T, which are pivoted between their ends to arms $s'$, which project from links of the chain. The rear extensions $t$ of the jaws embrace the sides of the chain, and the front portions $t'$ meet and are roughened on their meeting faces to hold the straws firmly. Springs are provided to force the ends $t'$ of the jaws together, and for economy of construction a rod $t^2$ is passed through apertures in the vertical extensions $t^3$, and a spring $t^4$ is placed on each end of the rod and bears against the extensions $t^3$ and against stops $t^8$ on the said rod. The amount of straw to be taken between the jaws is regulated by the guard or pin U, which is secured to one jaw and works through an opening $t^5$ in the other jaw. This pin or guard may be adjustable, thereby adapting the picker to take up variable quantities of straw. Any means may be devised to adjust the pin, that shown being preferred, owing to its simplicity. Both jaws have corresponding slots $t^5$, and the pin U is threaded at one end and provided with a collar or stop $u$, the threaded end being projected through the slot $t^5$ in one of the jaws and provided with a nut $u'$ on its threaded end. The jaw is held between the stop $u$ and the nut $u'$, the stop $u$ being sunk in a groove $t^7$. To adjust the pin the nut $u'$ is loosened, when the pin U can be moved in the slot to the required place, after which the nut is screwed up tight. A tripper V is arranged in juxtaposition to the hopper to open the jaws, and a corresponding tripper W W is arranged near the strand-forming mechanism to release the straw from the pickers. The tripper V near the hopper is secured to the base O, and is composed of a frame $v$, which surrounds the opening in the said base, and of vertical arms $v'$, the free ends of the arms $v'$ being made flaring to receive the rear extensions $t$ of the pickers and gradually press them together so as to open the jaws $t'$. The tripper near the twine-forming mechanism is composed of arms W, which correspond with each other and are secured to the opposite sides of the sprocket-wheels and which flare at their outer ends.

The operation of the machine is as follows: The shaft H is set in motion by turning the crank H' on the outer end thereof, and it, through the gearing and connections hereinbefore specified, operates the strand-forming mechanism, the flier, the spool, the hoppers, and the carriers. The straw or other twine-forming material having been placed in the hoppers is taken therefrom in proper quantities by the carriers and conveyed to the twine-forming mechanism which fashions it into twine, and the completed article is wound on the spool K'. The pickers are disposed on the chains to operate alternately. The guides or chutes M, arranged obliquely to the line of motion of the carriers, receive the twine-forming material when released from the pickers and convey it into the rotary strand-forming twisting-heads. The guard-wires $m$ prevent the upper ends of the straw or other twine-forming material from becoming entangled with the operating mechanism. The chutes are parallel with the axes of the strand-forming heads, and their bottoms are in line with the hollow journals of the said heads to guide the straw therein. The spool-support L' is fed back and forth on the feed-screw L by means of the lever 12 and the threads 8 and 9 on the said feed-screw. Only one end of the lever is in engagement with the thread on the feed-screw at a time, and is held in an operative position by the spring 14 on the head of the spool-support. The end of the lever near the spring 14 is held in engagement with the feed-screw by the said spring 14 extending over it. (See Fig. 14.) When the opposite end of the lever is in engagement with the feed-screw, the relative position of the spring 14 and the proximate end of the lever is changed, the spring extending beneath the said end and pressing it away from the feed-screw, thereby holding the opposite end of the lever in engagement with the feed with a corresponding pressure. As one end of the spool-support approaches the side of the flier in its travel the proximate projecting end of the lever 12 rides upon the cam 13, which disengages the said end from the feed-screw and effects an engagement of the opposite end of the said lever with the said feed-screw, thereby reversing the motion of the spool-support.

Having thus described my invention, what I claim, and desire to secure by Letters Patent, is—

1. In a machine for making twine from straw, grass, and like material, the combination of a twine-forming mechanism, a hopper placed directly above the twine-forming mechanism, a follower, means for pressing the follower on the twine-forming material, a vertically-traveling carrier to take the twine-forming material from the hopper, and a chute arranged obliquely to the line of motion of the said carrier to receive the twine-forming-material and guide it to the twine-forming mechanism, substantially as described.

2. In a machine for making twine from straw, grass, and like material, the combination, with the twine-forming mechanism, a hopper placed directly above the twine-forming mechanism, a follower, means for pressing the follower on the twine-forming material, and a vertically-traveling carrier, of pickers, a trip projected horizontally from the hopper across the path of the carrier for opening the pickers at the hopper, and a trip adjacent to the twine-forming mechanism, substantially as described.

3. In a machine for making twine from straw, grass, and like material, the combination, with the twine-forming mechanism, a hopper placed directly above the twine-forming mechanism, a follower, and means for pressing the follower on the twine-forming material, of a vertically-traveling carrier, pickers secured horizontally to the carrier between their ends and having portions embracing the edges of the carrier, a trip located near the twine-forming mechanism and projected from the sides of the lower support of the carrier, and a trip juxtaposed to the hopper, substantially as set forth.

4. In a machine for making twine from straw, grass, and like material, the combination, with the twine-forming mechanism, a hopper placed directly above the twine-forming mechanism, a follower, and means for pressing the follower on the twine-forming material, of a vertically-traveling carrier, pickers secured horizontally between their ends to the carrier and having their rear portions embracing the edges thereof, a trip secured to the hopper and projected horizontally therefrom across the path of the carrier to operate the pickers to enable them to grasp some of the twine-forming material, and a corresponding trip arranged in juxtaposition to the twine-forming mechanism and extended from the sides of the lower support of the said carrier, substantially as set forth.

5. The combination, with a vertically-traveling carrier, of the picker secured horizontally thereto, each picker comprising two jaws which are adapted to separate and to close and grasp the twine-forming material and having their rear ends embracing the sides of the carrier, substantially as set forth.

6. The combination, with the carrier, of the pickers, each comprising two jaws which are pivoted between their ends, the jaws having lateral extensions, a rod passing through the said extensions, and springs on the rod to effect a closing of the jaws, substantially as set forth.

7. The combination, with the twine-forming mechanism, a hopper, and a carrier, of pickers having their jaws pivoted between their ends and having their rear ends embracing the sides of the carrier, and trippers in juxtaposition to the hopper, and the twine-forming mechanism adapted to press on the rear ends of the jaws, substantially as described.

8. The combination, with the strand-forming rotary twisting-heads arranged relatively at an angle to each other and having motion on their axes only, and the rotary twisting-head to twist together the strands to form the twine, of the guides or chutes for directing the twine-forming material into the said twisting-heads, arranged substantially in line with the axes of the twisters, substantially as set forth.

9. The combination, with the strand-forming rotary twisting-heads arranged relatively at an angle to each other and having motion on their axes only, the rotary twisting-head for twisting together the strands to form the twine, and the carriers, of the guides or chutes arranged substantially in line with the axes of the said twisting-heads, and the guard-wires to prevent entanglement of the twine-forming material with the driving mechanism and to cause the material to enter the said guides, substantially as set forth.

10. In a machine for making twine from straw, grass, and like material, the combination, with a hopper having an egress-slot and the carrier having pickers to take the twine-forming material from the hopper, of mechanism for agitating the material in the hopper, substantially as described.

11. In a machine for making twine from straw, grass, and like material, the combination, with the twine-forming mechanism, of a hopper mounted in guides, a carrier provided with pickers, a bell-crank lever, actuating mechanism for the said bell-crank lever, and adjustable connections between the hopper and the said bell-crank lever, substantially as set forth.

12. The combination of the twine-forming mechanism, a horizontal shaft geared with the said twine-forming mechanism, a hopper, a carrier passing around supports on the said shaft and near the hopper, and mechanism between the hopper and the said shaft for vibrating the said hopper, substantially as set forth.

13. The combination, with a hopper and the carriers, of a follower in the hopper and means for pressing the follower on the twine-forming material in the hopper, substantially as described.

14. The combination, with the hopper and the follower, of a rotatable support and spring-arms connected at one end with the said support and having their other ends bearing on the follower at different points, whereby the follower is pressed evenly toward the bottom of the hopper, substantially as described.

15. The combination, with the hopper and the follower, of the rotatable support, the spring-arms connected with the said support, the lever for rotating the said support, and a notched bar for holding the lever at the required position, substantially as described.

16. In a machine for making twine from straw, grass, and like material, the combination, with the strand-forming mechanism, of the flier-frame, a horizontal feed-screw, a spool-support on the feed-screw, and connections between the said spool-support and feed-screw for reversing the travel of the former on the latter, a shaft parallel with the feed-screw, a connecting device, as belt $l'$, between the said shaft and spool-support, and actuating mechanism for operating the said shaft, substantially as described.

17. In a machine for making twine from straw, grass, and like material, the combination, with the strand-forming mechanism, of the flier-frame, a horizontal feed-screw, a spool-support on the feed-screw, and connections between the said spool-support and feed-screw for reversing the travel of the former on the latter, a shaft parallel with the feed-screw, mechanism to operate the said shaft, and a belt passing around the spool-supporting sleeve and the said shaft and adapted to move on the latter from end to end, substantially as and for the purpose described.

18. In a machine for making twine from straw, grass, and like material, the combination, with the strand-forming mechanism, of the flier-frame, a horizontal feed-screw, a spool-support on the feed-screw, and connections between the said spool-support and feed-screw for reversing the travel of the former on the latter, a shaft parallel with the feed-screw, a bevel-wheel on the lower stationary journal of the flier, a corresponding bevel-wheel on the said horizontal shaft meshing with the bevel-wheel on the journal, and the belt $l'$ between the spool-support and the said shaft, substantially as described.

19. The combination, with the rotary strand-forming twisting-heads arranged at an angle to each other and having motion on their axes only, of a rotary twister arranged in close proximity to the delivery ends of the strand-forming twisting-heads to twist the strands together, guides or chutes arranged in line with the axes of the twisting-heads, hoppers, and carriers, provided with pickers which are arranged to alternately convey the twine-forming material from the hoppers to the guides or chutes of the respective strand-forming twisting-heads, substantially as specified.

20. The combination, with the strand-forming twisting-heads, the hoppers, and the carriers, of the guides or chutes arranged obliquely to the line of motion of the carriers and adapted to receive the twine-forming material and guide the same into the rotary strand-forming twisting-heads, substantially as set forth.

In testimony whereof I affix my signature in presence of two witnesses.

GEORGE H. ELLIS.

Witnesses:
C. M. SPRAGUE,
H. D. WHITEFIELD.